United States Patent
Davis et al.

(10) Patent No.: US 8,300,632 B2
(45) Date of Patent: Oct. 30, 2012

(54) SYSTEM AND METHOD FOR DISTRIBUTED CALL MONITORING/RECORDING USING THE SESSION INITIATION PROTOCOL (SIP)

(75) Inventors: Sheldon Davis, Aptos, CA (US); Alan Johnston, St. Louis, MO (US); Valentine Matula, Granville, OH (US)

(73) Assignee: Avaya Inc., Basking Ridge, NJ (US)

( * ) Notice: Subject to any disclaimer, the term of this patent is extended or adjusted under 35 U.S.C. 154(b) by 1058 days.

(21) Appl. No.: 12/211,566

(22) Filed: Sep. 16, 2008

(65) Prior Publication Data
US 2009/0213839 A1    Aug. 27, 2009

Related U.S. Application Data

(60) Provisional application No. 61/066,576, filed on Feb. 21, 2008.

(51) Int. Cl.
*H04L 12/66* (2006.01)
(52) U.S. Cl. ......................................................... 370/352
(58) Field of Classification Search ........................ None
See application file for complete search history.

(56) References Cited

U.S. PATENT DOCUMENTS

| | | |
|---|---|---|
| 5,506,901 A | 4/1996 | Reeder |
| 7,379,421 B1 | 5/2008 | Gao et al. |
| 8,000,465 B2 * | 8/2011 | Williams et al. ........... 379/266.1 |
| 2003/0026406 A1 * | 2/2003 | Ernstrom et al. ........ 379/202.01 |
| 2004/0202295 A1 * | 10/2004 | Shen et al. ................ 379/112.01 |
| 2006/0133595 A1 * | 6/2006 | Ravishankar .................. 379/229 |
| 2007/0143858 A1 | 6/2007 | Hearty |
| 2007/0153776 A1 * | 7/2007 | Joseph et al. .................. 370/356 |
| 2009/0028132 A1 * | 1/2009 | Portman et al. ............... 370/352 |
| 2010/0150138 A1 * | 6/2010 | Bjorsell et al. ................ 370/352 |
| 2011/0263229 A1 * | 10/2011 | Gisby et al. ................... 455/413 |

* cited by examiner

*Primary Examiner* — Chirag Shah
*Assistant Examiner* — Amar Persaud

(57) ABSTRACT

The system and method described herein allows for full monitoring and recording of SIP calls by using standard SIP messages. During the call set up between a first SIP device and a second SIP device, information is derived from a first SIP INVITE message from a first SIP device. Information is then derived from a response message from the second SIP device. The monitor/recorder receives one or more SIP INVITE messages to set up a first media stream from the first SIP device and a second media stream from the second SIP device to the monitor/recorder. The monitor/recorder receives the first and/or second media stream. The monitor/recorder then records the first and/or second media stream. In addition, the system and method provide for recording on demand, required recording, and pause-and-resume recording of SIP calls.

37 Claims, 8 Drawing Sheets

SYSTEM AND METHOD FOR DISTRIBUTED CALL MONITORING/RECORDING USING THE SESSION INITIATION PROTOCOL (SIP)

RELATED U.S. APPLICATION DATA

This application claims the benefit under 35 U.S.C. §119 (e) of U.S. Provisional Application No. 61/066,576, filed Feb. 21, 2008, entitled "A Method and Apparatus for Distributed Secure Call Recording Using the Session Initiation Protocol (SIP) and Secure Real-time Transport Protocol (SRTP)."

TECHNICAL FIELD

The system and method relates to call monitoring systems, and in particular to systems and methods of monitoring and recording SIP calls.

BACKGROUND

Currently, the Session Initiation Protocol (SIP) [RFC3261] does not define a standard way to monitor or record SIP calls. SIP does define a method for creating conference calls. Conference calls are designed for two-way communication (send/receive) between all devices on the conference call. However, conference calls are not designed for devices such as monitors/recorders that only need to receive and not transmit a media stream.

Conference call solutions require extensive processing in the network to mix all of the media streams. In addition to higher costs, other problems such as lost packets and dropped calls can result if network resources become overloaded. Moreover, it is difficult to un-mix a stream and monitor and/or record individual streams of a call.

Other solutions can monitor SIP calls based on existing SIP protocols. However, these solutions cannot provide full monitoring of media streams using standard SIP calls. For example, the system described in U.S. Patent Application No. 2007/0143858 describes a system that can provide third party surveillance by what is called a "partial wiretap". This system can detect and record certain events such as the start of a SIP call, the end of a SIP call, and the duration of a SIP call. This system does not monitor individual media streams because the monitoring device is not set up to monitor the media streams of the SIP call. Therefore, this solution falls short of providing full call monitoring and recording.

Legacy systems such as described in U.S. Pat. No. 5,506,901 allow for monitoring of Time Division Multiplexed (TDM) streams of voice calls. However, this system is not designed to work using standard SIP messages and cannot be used to monitor a SIP call.

The problem with existing systems and standards is that they do not provide the ability to fully monitor and record a SIP call using standard SIP messages. Moreover, these systems do not provide the capability of monitoring and recording individual media streams of a SIP call.

SUMMARY

The system and method described herein allows for full monitoring and recording of SIP calls by using standard SIP messages. During the call set up between a first SIP device and a second SIP device, information is derived from a first SIP INVITE message from a first SIP device. Information is then derived from a response message from the second SIP device.

The monitor/recorder receives one or more SIP INVITE messages to set up a first media stream from the first SIP device and a second media stream from the second SIP device to the monitor/recorder. The monitor/recorder receives the first and/or second media stream. The monitor/recorder then records the first and/or second media stream. In addition, the system and method provide for recording on demand, required recording, and pause-and-resume recording of SIP calls.

BRIEF DESCRIPTION OF THE DRAWING

These and other features and advantages of the system and method will become more apparent from considering the following description of an illustrative embodiment of the system and method together with the drawing, in which.

DETAILED DESCRIPTION

Figure 1:
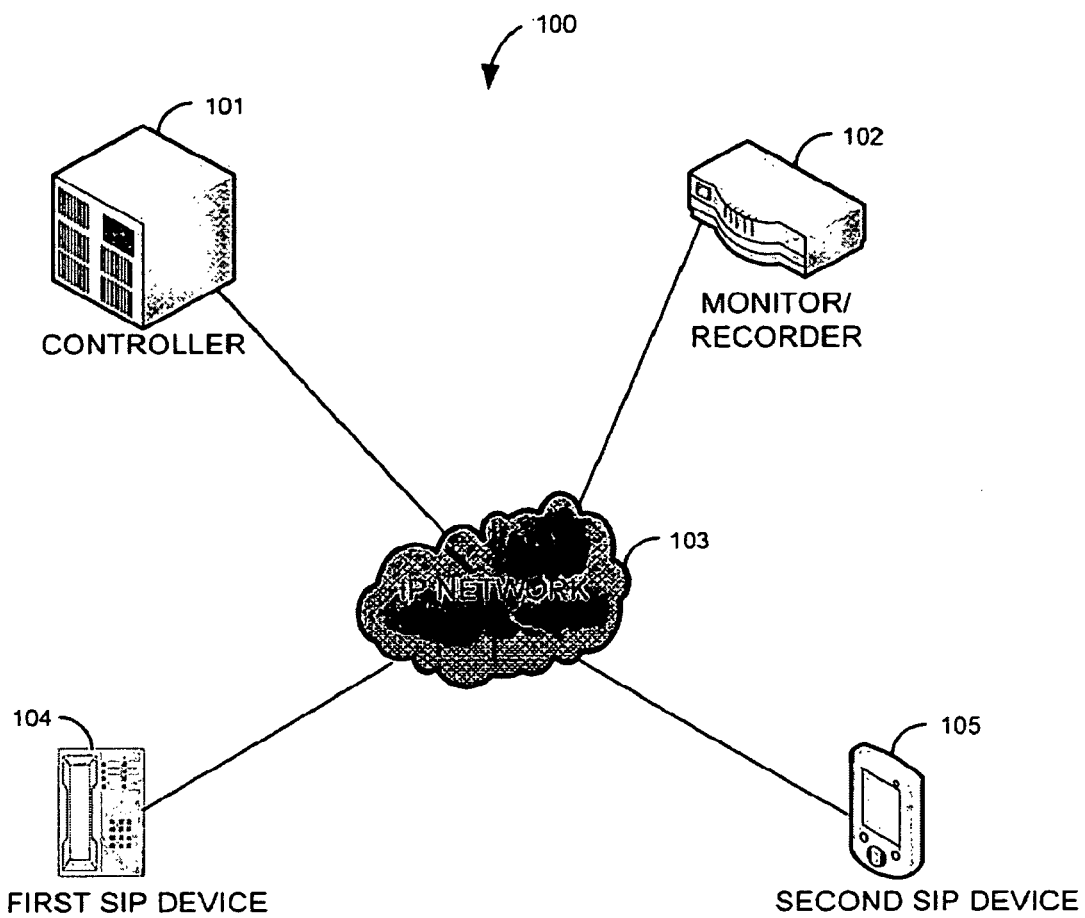
FIG. 1 is a block diagram illustrating a system for monitoring and recording a SIP call.

FIG. 1 is a block diagram illustrating a system 100 for monitoring and recording a SIP call. The system 100 comprises a controller 101, a monitor/recorder 102, an Internet Protocol (IP) network 103, a first SIP device 104, and a second SIP device 105. Controller 101, the monitor/receiver 102, the first SIP device 104, and the second SIP device 105 all connect to the IP network 103.

The monitor/recorder 102 may be any device that can receive a media stream. The first SIP device 104 and the second SIP device 105 may be any device that supports SIP, such as a telephone, a gateway, a server, a soft client, a Personal Digital Assistant (PDA), and the like. Controller 101 may be any device that supports SIP, such as a SIP proxy server, a gateway, a network server, a PBX, and the like. As shown in FIG. 1, controller 101 operates in a standard SIP Back-to-Back User Agent (B2BUA) configuration. In the B2BUA configuration, SIP media streams between the first SIP device 104 and the second SIP device are sent through controller 101. The IP network 103 may be any network that supports IP, such as a wired network, a wireless network, and a fiber optic network. The IP network 103 may also contain time division multiplexed portions such as the public switched network.

A SIP call is set up between the first SIP device 104 and the second SIP device 105. The SIP call may be any type of SIP call, such as a voice call, a video call, a text message call, a multimedia call or any combination. During the call set up, the controller 101 receives a first SIP INVITE from the first SIP device 104. The controller 101 derives information from the Session Description Protocol (SDP) [RFC3264] from the first SIP INVITE message. This information is used to set up a first media stream from the first SIP device 104 to the monitor/recorder 102. Controller 101 derives SDP information from a response message from the second SIP device 105. This information is used to set up a second media stream from the second SIP device 105 to the monitor/recorder 102. The monitor/recorder 102 receives one or more additional SIP INVITE messages from controller 101 to set up a first media stream from the first SIP device 104 and/or a second media stream from the second SIP device 105 to the monitor/recorder 102.

The first media stream is sent from the first SIP device 104 to controller 101. Controller 101 then sends the first media stream to the second SIP device 105 and the monitor/recorder 102. Likewise, the second SIP device 105 sends the second media stream to controller 101. Controller 101 sends the second media stream to the first SIP device 104 and the monitor/recorder 102.

The monitor/recorder 102 may optionally elect to not record either the first or second media streams, record portions of either the first or second media stream, record both media streams, or the like. The monitor/recorder 102 may elect to mix the first and second media streams into a single media stream for recording or may record each media stream individually.

In addition, the monitor/recorder 102 may record the first or second media stream based on one or more events. The monitor/recorder 102 may record either or both media streams based on the first SIP device's telephone number, the second SIP device's telephone number, the length of the call, detection of key words in the call, input from an interactive voice response system, a non-call center call, an outbound call, an inbound call, a button push, a user, a user's title, a user's group, and the like. For example, the monitor/recorder 102 may always record calls from a specific SIP device (telephone number). The monitor/recorder 102 may start recording when the monitor/recorder 102 detects a specific word in the first or second media streams. In another example, the monitor/recorder 102 may elect to not record all outbound calls from a call center.

The monitor/recorder 102 may receive an encryption key that is used to encrypt either the first media stream or the second media stream or both. Moreover, there may more than two media streams. The system 100 may accommodate more SIP devices (not shown) that are part of a conference call. In this case, there may be more than two media streams received by the monitor/recorder 102. When referring to call set up in both the specification and the claims, a call may support a plurality of SIP devices and a plurality of media streams received by the monitor/recorder 102.

In regards to FIGS. 2-7, illustratively, controller 101, monitor/recorder 102, the first SIP device 104, and the second SIP device are stored-program-controlled entities, such as computers, which performs the methods of FIGS. 2-7 by executing programs stored in storage media, such as memories or disks. Moreover, the messages in FIGS. 2-7 may be sent and received in different orders based on implementation and network conditions.

Figure 2:
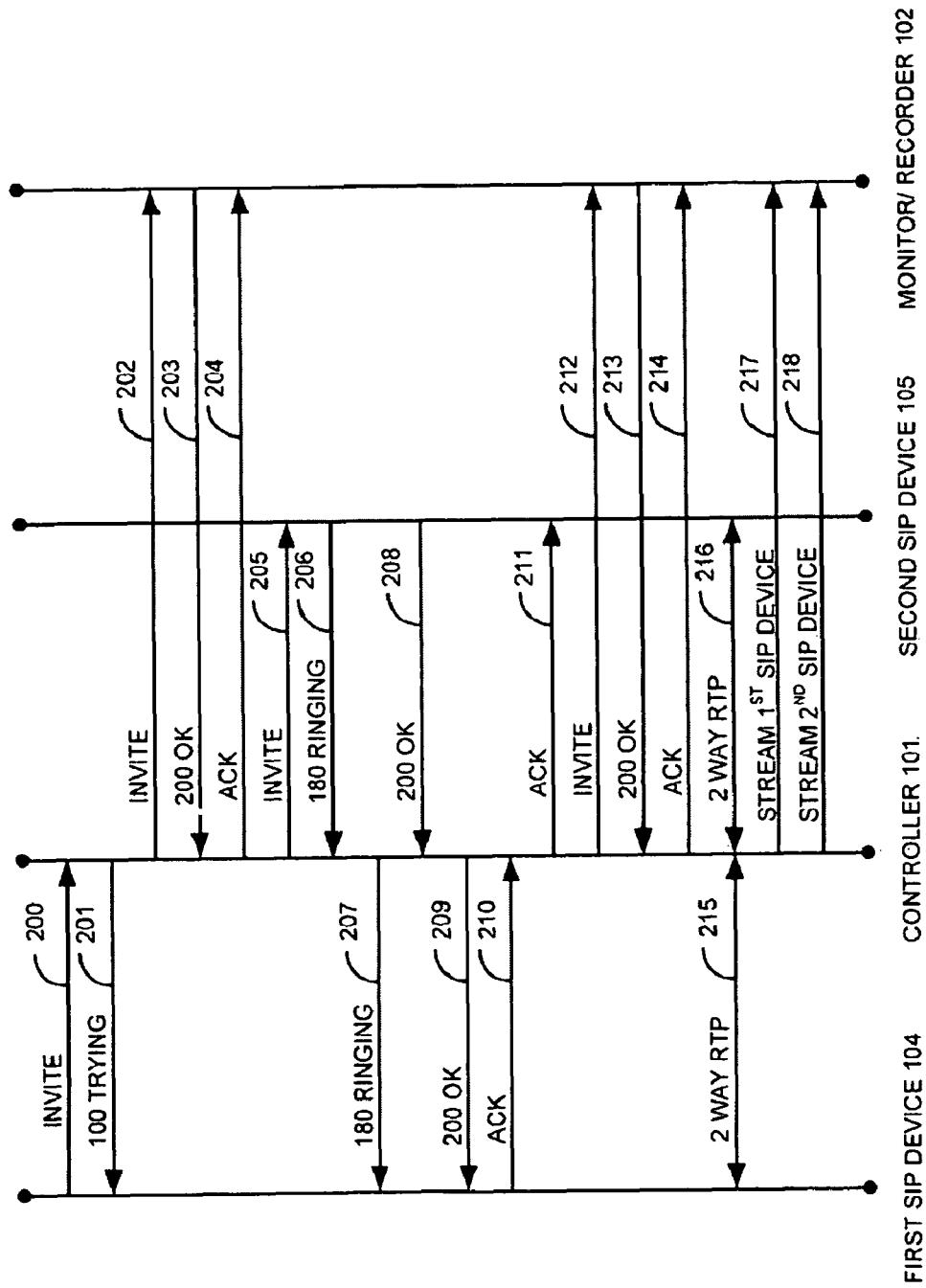
FIG. 2 is a timing diagram illustrating a method for monitoring and recording separate media streams for a SIP call.

FIG. 2 is a timing diagram illustrating a method for monitoring and recording separate media streams for a SIP call. The call set up process begins by the first SIP device 104 sending 200 a SIP INVITE message to controller 101. The SIP INVITE message is a request to set up a call between the first SIP device 104 and the second SIP device 105. This message is not a SIP INVITE message to set up a call to the monitor/recorder 101. The controller 101 responds by sending a SIP TRYING message 201 to the first SIP device 104. Controller 101 derives SDP information from the SIP INVITE message from step 200. This information is used to set up a media stream between the first SIP device 104 and the monitor/recorder 102.

Controller 101 optionally sends 202 a SIP INVITE message using information derived from the first SIP INVITE message to the monitor/recorder 102. The controller 101 does not have to send 202 the SIP INVITE message because the controller 101 can send the derived information later in step 212 if the controller elects. The SIP INVITE message from step 202 is used to set up the first media stream from the first SIP device 104 to the monitor/recorder 102. The monitor/recorder 102 sends 203 a SIP OK message to controller 101. Controller 101 acknowledges the SIP OK message by sending 204 a SIP ACK to the monitor/recorder 102.

Controller 101 sends 205 the SIP INVITE message from step 200 to the second SIP device 105. The second SIP device 105 sends 206 a SIP RINGING message to controller 101. Controller 101 sends 207 the SIP RINGING message to the first SIP device 104. The second SIP device 105 sends 208 a SIP OK message to controller 101. This OK message is a response to the SIP INVITE message that was sent in step 205. Controller 101 derives SDP information from the SIP OK message in step 208. Controller 101 sends 209 the SIP OK message to the first SIP device 104. The first SIP device 104 acknowledges the SIP OK by sending 210 a SIP ACK to controller 101. Controller 101 sends 211 the SIP ACK to the second SIP device 105.

The information derived from the SIP OK message in step 208 is processed to generate the SIP INVITE message used in step 212 that identifies the media stream of the second SIP device 105. In addition, the information derived from the first SIP INVITE message in step 200 may also be included to identify the first media stream from the first SIP device 104. The generated SIP INVITE message is then sent 212 from controller 101 to the monitor/recorder 102. The optional SIP INVITE message from step 202 and the SIP INVITE message from step 212 are used to set up the first media stream and/or second media stream to the monitor/recorder 102. The monitor/recorder 102 acknowledges the SIP INVITE message from step 212 by sending 213 a SIP OK to controller 101. Controller 101 sends 214 a SIP ACK to monitor/recorder 102.

At this point, a two way Real-time Transport Protocol (RTP) [RFC3550] or a Secure Real-time Transport Protocol (SRTP) [RFC3711] session is established 215, 216 between the first SIP device 104, controller 101, and the second SIP device 105. Controller 101 receives the first media stream from the first SIP device 104. Controller 101 sends 217 the first media stream to the monitor/recorder 102. Likewise, controller 101 receives the second media stream from the second SIP device 105. Controller 101 sends 218 the second media stream to the monitor/recorder 102. As the monitor/recorder 102 receives the first media stream and the second media stream, the monitor/recorder 102 may optionally record all of the streams or various portions of the streams, depending on various events.

Below is a listing of example SIP messages used in FIG. 2:

Message 200
    INVITE sip:+13145551212@biloxi.example.com;user=phone SIP/2.0
    Via: SIP/2.0/UDP client.atlanta.example.com:5060
    ;branch=z9hG4bK74bf9
    Max-Forwards: 70
    From: <sip:+17325551212@atlanta.example.com;user=phone>;
    tag=1234567
    To: <sip:+13145551212@biloxi.example.com;user=phone>
    Call-ID: 543k349dfkj234kd

```
        CSeq: 1 INVITE
        Contact: <sips:alice@client.atlanta.example.com>
        Content-Type: application/sdp
        Content-Length: ...
        v=0
        o=alice 2890844526 2890844526 IN IP4 client.atlanta.example.com
        s=
        c=IN IP4 client.atlanta.example.com
        t=0 0
        m=audio 49170 RTP/AVP 0
        a=rtpmap:0 PCMU/8000
    Message 202
        INVITE sip:recorder@example.com SIP/2.0
        Via: SIP/2.0/UDP controller.example.com:5060
        ;branch=z9hG4bK83749.1
        ;received=192.0.2.54
        Via: SIP/2.0/UDP client.atlanta.example.com:5060
        ;branch=z9hG4bK74bf9
        Max-Forwards: 70
        From: <sip:+17325551212@atlanta.example.com;
        user=phone>;tag=1234567
        To: <sip:+13145551212@biloxi.example.com;user=phone>
        Call-ID: 3829109203023
        CSeq: 10 INVITE
        Contact: <sip:controller.example.com>
        Content-Type: application/sdp
        Content-Length: ...
        v=0
        o=alice 2890844566 2890844566 IN IP4 controller.example.com
        s=
        c=IN IP4 controller.example.com
        t=0 0
        m=audio 49174 RTP/AVP 0
        a=rtpmap:0 PCMU/8000
        a=sendonly
    Message 208
        SIP/2.0 200 OK
        Via: SIP/2.0/UDP controller.example.com:5060
        ;branch=z9hG4bK83749.1
        ;received=192.0.2.54
        Via: SIP/2.0/UDP client.atlanta.example.com:5060
        ;branch=z9hG4bK74bf9
        ;received=192.0.2.103
        Record-Route: <sips:ss1.example.com;lr>
        From: <sip:+17325551212@atlanta.example.com;
        user=phone>;tag=1234567
        To: <sip:+13145551212@biloxi.example.com;user=phone>;
        tag=314159
        Call-ID: 543k349dfkj234kd
        CSeq: 1 INVITE
        Contact: <sips:bob@client.biloxi.example.com>
        Content-Type: application/sdp
        Content-Length: ...
        v=0
        o=bob 2890844527 2890844527 IN IP4 client.biloxi.example.com
        s=
        c=IN IP4 client.biloxi.example.com
        t=0 0
        m=audio 3456 RTP/AVP 0
        a=rtpmap:0 PCMU/8000
    Message 209
        SIP/2.0 200 OK
        Via: SIP/2.0/UDP client.atlanta.example.com:5060
        ;branch=z9hG4bK74bf9
        ;received=192.0.2.103
        From: <sip:+17325551212@atlanta.example.com;
        user=phone>;tag=1234567
        To: <sip:+13145551212@biloxi.example.com;user=phone>;
        tag=28384837
        Call-ID: 543k349dfkj234kd
        CSeq: 1 INVITE
        Contact: <sips:controller.example.com>
        Content-Type: application/sdp
        Content-Length: ...
        v=0
        o=alice 2890844526 2890844526 IN IP4 controller.example.com
        s=
        c=IN IP4 controller.example.com
        t=0 0
        m=audio 49234 RTP/AVP 0
        a=rtpmap:0 PCMU/8000
    Message 212
        INVITE sip:recorder@example.com SIP/2.0
        Via: SIP/2.0/UDP controller.example.com:5060
        ;branch=z9hG4bK83743.1
        ;received=192.0.2.54
        Via: SIP/2.0/UDP client.atlanta.example.com:5060
        ;branch=z9hG4bK74b91
        Max-Forwards: 70
        From: <sip:+17325551212@atlanta.example.com;
        user=phone>;tag=1234567
        To: <sip:+13145551212@biloxi.example.com;user=phone>;
        tag=7636512
        Call-ID: 3829109203023
        CSeq: 11 INVITE
        Contact: <sip:controller.example.com>
        Content-Type: application/sdp
        Content-Length: ...
        v=0
        o=alice 2890844566 2890844566 IN IP4 controller.example.com
        s=
        c=IN IP4 controller.example.com
        t=0 0
        m=audio 49174 RTP/AVP 0
        a=rtpmap:0 PCMU/8000
        a=sendonly
        m=audio 49158 RTP/AVP 0
        a=rtpmap:0 PCMU/8000
        a=sendonly
```

Figure 3:
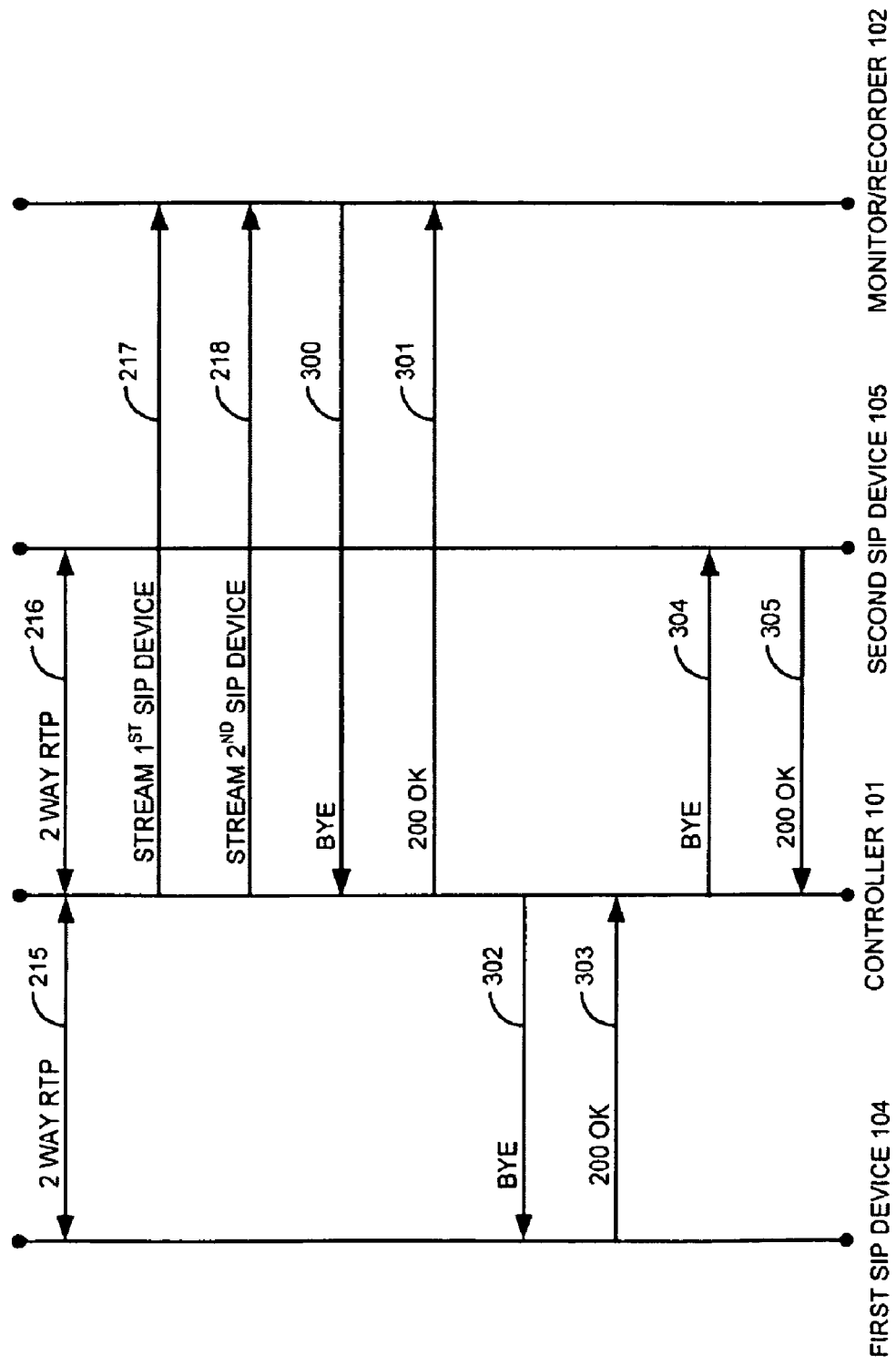
FIG. 3 is a timing diagram illustrating a method for required recording of a SIP call.

FIG. 3 is a timing diagram illustrating a method for required recording of a SIP call. This process is used for calls that require all of the call to be recorded. If only part of the call has been recorded and the recorder for some reason cannot record the rest of the call, the call is disconnected. For example, if the monitor/recorder's disk or memory becomes full during the call, then the call is disconnected. Likewise, if during the initial call set up, the monitor/recorder 102 determines that the monitor/recorder 102 cannot record the call for some reason, the call is disconnected.

This embodiment for recording required calls begins after the two-way RTP 215, 216 media session between the first SIP device 104, the second SIP device 105 and the controller 101 is established as disclosed in FIG. 2. The first media stream from controller 101 and the second media stream from controller 101 have been set up 217, 218 to the monitor/recorder 102. If the monitor/recorder 102 for some reason cannot or does not want to continue/start to record the call, the monitor/recorder 102 sends 300 a SIP BYE to controller 101. Controller 101 sends 301 a SIP OK to the monitor/recorder 102. Controller 101 sends 302 a SIP BYE to the first SIP device 104. The first SIP device 104 sends 303 a SIP OK to controller 101. Controller 101 sends 304 a SIP BYE to the second SIP device 105. The second SIP device 105 sends 305 a SIP OK to controller 101. This results in the call being disconnected between the first SIP device 104 and the second SIP device 105.

Figure 4:
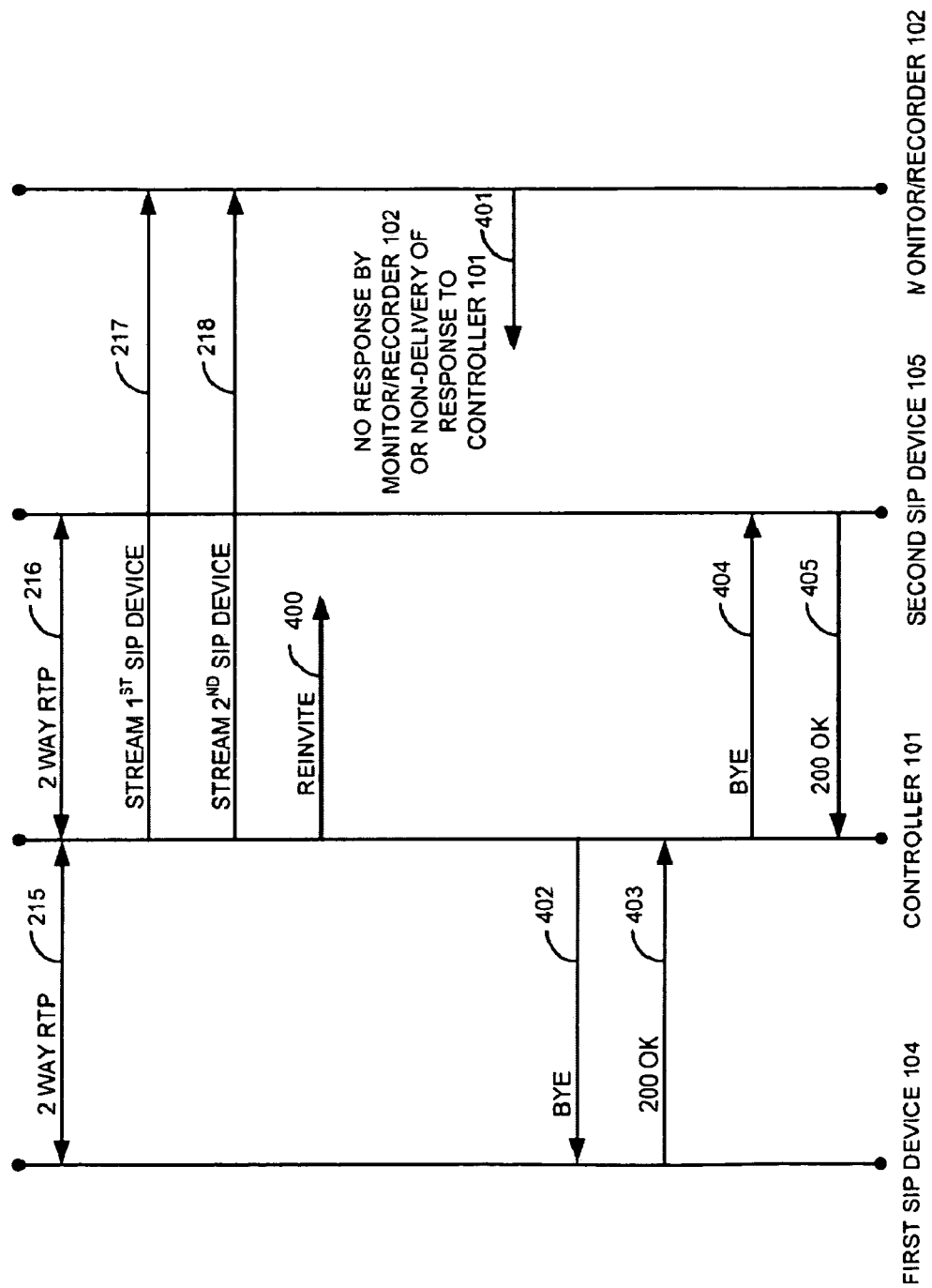
FIG. 4 is a timing diagram illustrating a method for required recording of a SIP call.

FIG. 4 is a timing diagram illustrating a method for required recording of a SIP call. This embodiment is used when the monitor/recorder 102 is not responding or the IP network 103 is no longer working. For example, if the IP network 103 between controller 101 and the monitor/recorder 102 becomes inoperative, the call is disconnected. Likewise, if the monitor/recorder 102 becomes inoperative, the call is disconnected. Moreover, if either of the streams from the first SIP device 104 or the second SIP device 105 to the monitor/recorder 102 becomes inoperative, the call is disconnected.

This embodiment for recording required calls begins after the two-way RTP 215, 216 media session between the first SIP device 104, the second SIP device 105 and the controller 101 is established as shown in FIG. 2. The first media stream from controller 101 and the second media stream from controller 101 have been set up 217, 218 to the monitor/recorder 102. Controller 101 periodically sends 400 a SIP RE-INVITE to the monitor/recorder 102. Controller 101 could also send 400 the SIP RE-INVITE based on a failure in the RTP/STRP protocol in the first media stream and/or the second media stream from controller 101 to the monitor/recorder 102.

If for some reason controller 101 does not receive 401 a response to the SIP RE-INVITE (or multiple SIP RE-INVITES) from the monitor/recorder 102, controller 101 commences to disconnect the call by sending 402 a SIP BYE to the first SIP device 104. The first SIP device 104 sends 403 a SIP OK to controller 101. Controller 101 sends 404 a SIP BYE to the second SIP device 105. The second SIP device 105 sends 405 a SIP OK to controller 101. The call is thus disconnected between the first SIP device 104 and the second SIP device 105.

Figure 5:
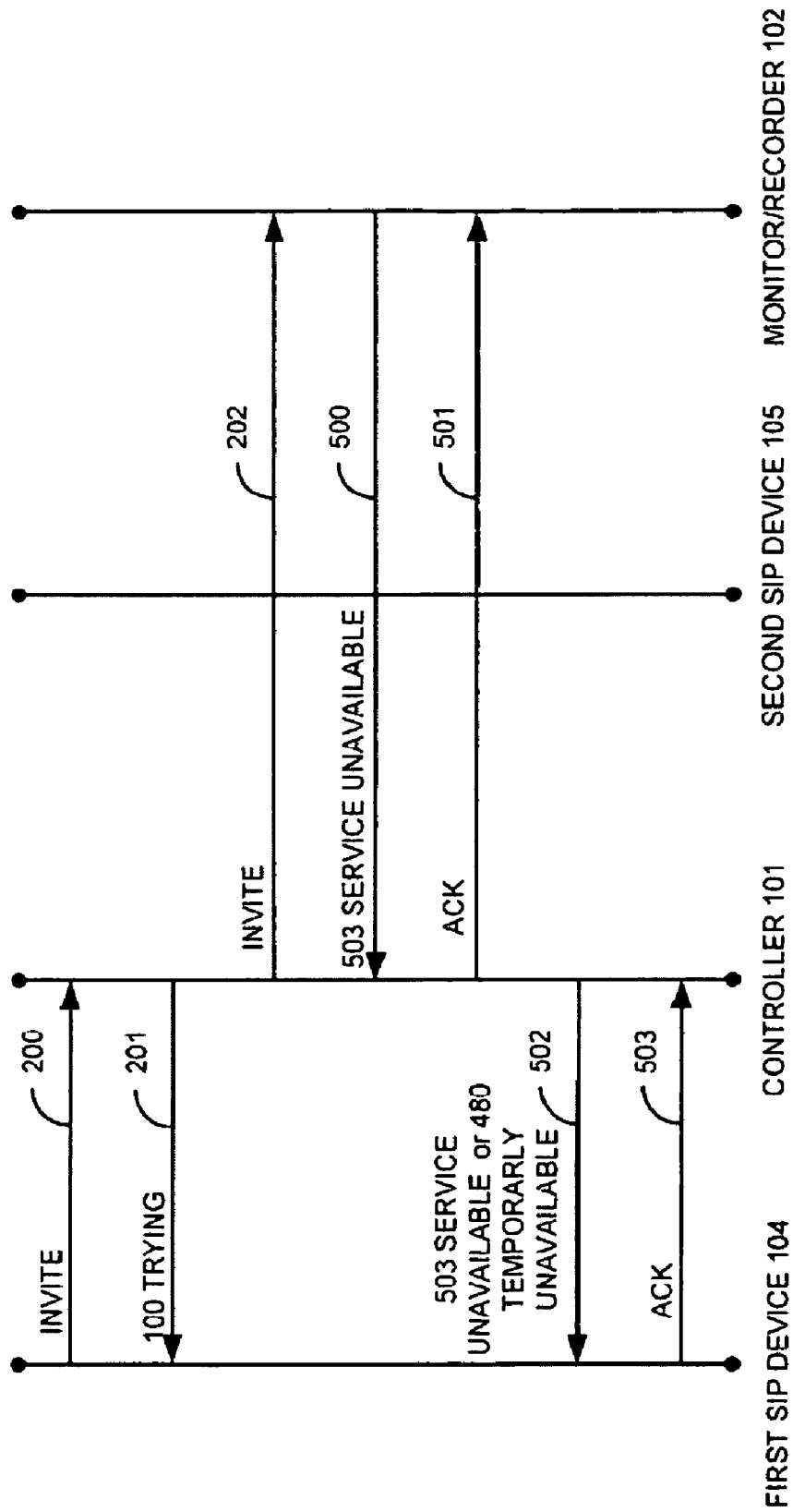
FIG. 5 is a timing diagram illustrating a method for required recording of a SIP call.

FIG. 5 is a timing diagram illustrating a method for required recording of a SIP call. This embodiment is used during the initial call set up process between the first SIP device 104, the second SIP device 105 and the controller 101. For example, if the monitor/recorder's disk is full, the call will not be set up because required recording is necessary for this call.

This embodiment for recording required calls begins when the first SIP device 104 sends 200 a SIP INVITE message to controller 101. The controller 101 responds by sending a SIP TRYING message 201 to the first SIP device 104. Controller 101 sends 202 the SIP INVITE message to the monitor/recorder 102. If the monitor/recorder 102 is unable or unwilling to record the call, the monitor/recorder 102 sends 500 a SIP SERVICE UNAVAILABLE message to controller 101. Controller 101 acknowledges the SIP SERVICE UAVAILABLE message by sending 501 a SIP ACK to the monitor/recorder 102. Controller 101 sends 502 a SIP SERVICE UNAVAILABLE message or a SIP TEMPORARLY UNAVAILABLE message to the first SIP device 104. The first SIP device 104 acknowledges the prior message by sending 503 a SIP ACK message to controller 101. The call between the first SIP device 104 and the second SIP device 105 is therefore not set up because the monitor/recorder 102 is not available.

The process described above will work for the SIP INVITE message that is sent in step 212. If the monitor/recorder 102 is unable or unwilling to record the call, the monitor/recorder 102 can send a SIP SERVICE UNAVAILABLE message and the call will not be set up.

Figure 6:
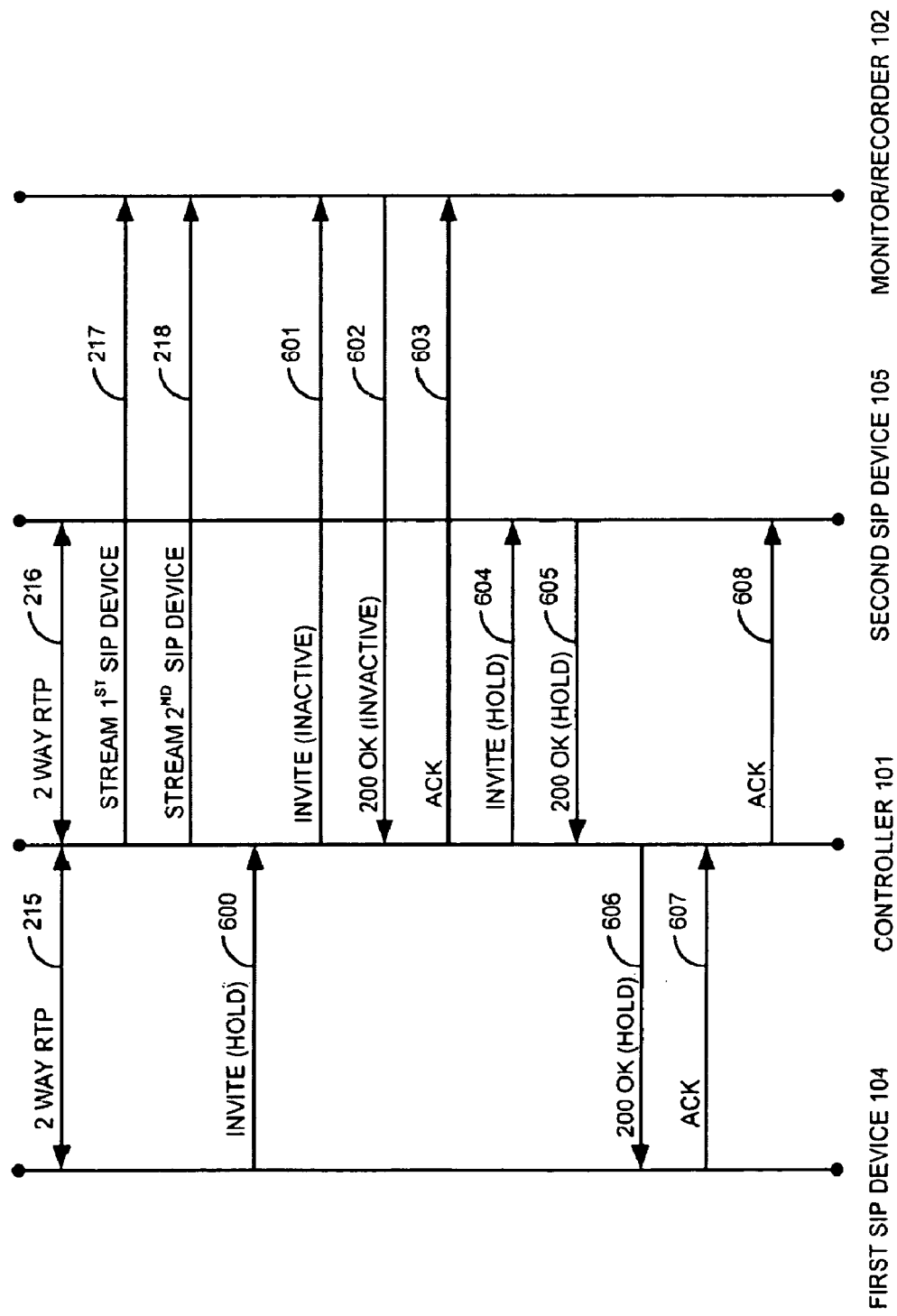
FIG. 6 is a timing diagram illustrating a method for pausing a recording of a SIP call.

FIG. 6 is a timing diagram illustrating a method for pausing a recording of a SIP call. The process begins after a two way RTP connection is established 215, 216 between the first SIP device 104, the second SIP device 105 and the controller 101 as shown in FIG. 2. Controller 101 sends 217 the first media stream to the monitor/recorder 102. Controller 101 also sends 218 the second media stream to the monitor/recorder 102.

At a point during the call, the first SIP device 104 sends 600 a SIP INIVTE (HOLD) message to controller 101. Controller 101 sends 601 a SIP INVITE (INACTIVE) message to the monitor/recorder 102. The monitor/recorder 102 sends 602 a SIP OK (INACTIVE) to controller 101. Controller 101 acknowledges the SIP OK by sending 603 a SIP ACK to the monitor/recorder 102. The monitor/recorder 102 stops recording the first media stream and the second media stream.

Controller 101 sends 604 the SIP INVITE (HOLD) message from step 600 to the second SIP device 105. The second SIP device 105 sends 605 a SIP OK (HOLD) to controller 101. Controller 101 sends 606 to the SIP OK (HOLD) to the first SIP device 104. The first SIP device 104 acknowledges the SIP OK by sending 607 a SIP ACK to controller 101. Controller 101 sends 608 the SIP ACK to the second SIP device 105. The call between the first SIP device 104 and the second SIP device 105 is put on hold and the call is no longer being recorded by the monitor/recorder 102.

Figure 7:
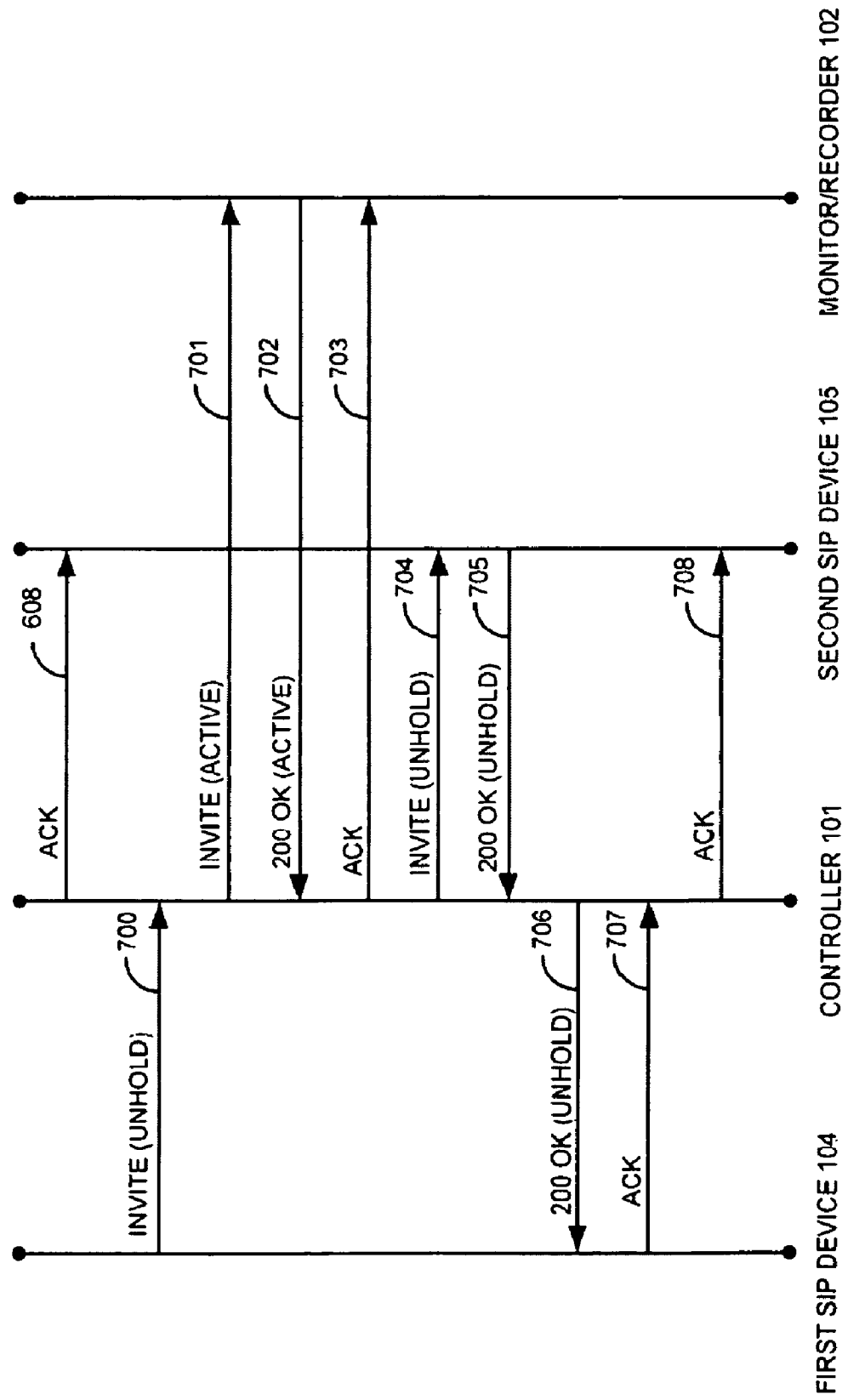
FIG. 7 is a timing diagram illustrating a method for resuming a paused recording of a SIP call.

FIG. 7 is a timing diagram illustrating a method for resuming the paused recording of a SIP call as shown in FIG. 6. Controller 101 sends 608 the SIP ACK to the second SIP device 105. This completes the call hold process. The first SIP device sends 700 a SIP INVITE (UNHOLD) message to controller 101. Controller 101 sends 701 a SIP INVITE (ACTIVE) message to the monitor/recorder 102. The monitor/recorder 102 sends 702 a SIP OK to controller 101. Controller 101 acknowledges the SIP OK by sending 703 a SIP ACK to the monitor/recorder 102. The monitor/recorder 102 is now ready to resume recording the first media stream and the second media stream.

Controller 101 sends 704 the SIP INVITE (UNHOLD) message from step 700 to the second SIP device 105. The second SIP device 105 sends 705 a SIP OK (UNHOLD) to controller 101. Controller 101 sends 706 the SIP OK (UNHOLD) to the first SIP device 104. The first SIP device 104 acknowledges the SIP OK (UNHOLD) by sending 707 a SIP ACK to controller 101. Controller 101 sends 708 the SIP ACK to the second SIP device 105. At this point, the call has been resumed and the call is now being recorded by the monitor/recorder 102.

Figure 8:
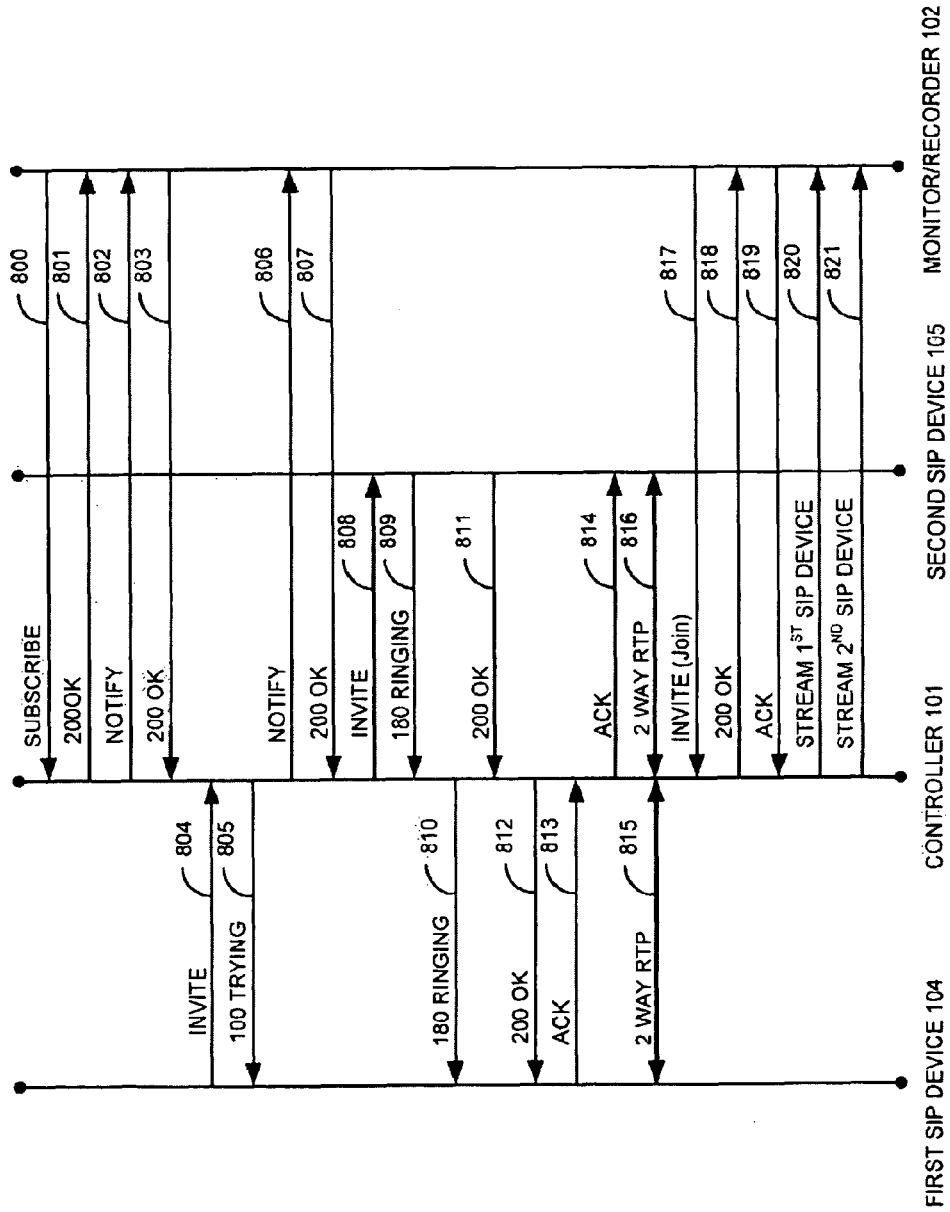
FIG. 8 is a timing diagram illustrating a method for subscribing to the monitoring and recording of a SIP call.

FIG. 8 is a timing diagram illustrating a method for subscribing to the monitoring and recording of a SIP call. The process begins when the monitor/recorder 102 sends 800 a SIP SUBSCRIBE [RFC3265] message to controller 101. The SIP SUBSCRIBE message may indicate specific events that the controller is to look for. Optionally, the SIP SUBSCRIBE message may indicate that the monitor/recorder 102 wants to monitor all events. Controller 101 responds to the SIP SUBSCRIBE message by sending 801 a SIP OK message to the monitor/recorder 102. Controller 101 then sends 802 a SIP NOTIFY message to the monitor/recorder 102 to indicate that controller 101 is ready to receive notifications from the monitor/recorder 102. The monitor/recorder 102 sends 803 a SIP OK to controller 101. At this point, controller 101 is ready to notify the monitor/recorder 102 of any of the subscribed events or all events.

The first SIP device 104 sends 804 a SIP INVITE message to controller 101. Controller 101 derives information from the SIP INVITE message in step 804. Controller 101 determines if the SIP INVITE message matches the events of the SIP SUBSCRIBE message in step 800. For example, if the SIP SUBSCRIBE was to monitor all calls from 999-999-9999 and the SIP INVITE message was from 999-999-9999, then there would be a match to the subscribed event. In a second embodiment, the controller 101 may notify the monitor/recorder 102 for all events and the monitor/recorder 102 could determine which events to monitor. After the controller 101 sends 805 the SIP TRYING message (since there is a match of the event), controller 101 sends 806 a SIP NOTIFY to the monitor/recorder 102. The monitor/recorder 102 sends 807 a SIP OK to controller 101.

Controller 101 sends 808 the SIP INVITE message from step 804 to the second SIP device 105. The second SIP device 105 sends 809 a SIP RINGING to controller 101. Controller 101 sends 810 the SIP RINGING message to the first SIP device 104. The second SIP device 105 sends 811 a SIP OK message to controller 101. The controller 101 derives information from the SIP OK message from step 811 to set up a second media stream. Controller 101 sends 812 the SIP OK message to the first SIP device 104. The first SIP device 104 sends 813 a SIP ACK to controller 101. Controller 101 sends 814 the SIP ACK to the second SIP device 105.

At this point, a two way RTP/SRTP media session is established 815, 816 between the first SIP device 104, the second SIP device 105 and the controller 101. The monitor/recorder 102 sends 817 a SIP INVITE message with a Join header field [RFC3911] to the controller 101 to request that the monitor/recorder 102 monitor the two way RTP/SRTP stream between the first SIP device 104 and the second SIP device 105. Using the information derived from the SIP INVITE message in step 804 and the SIP OK message in step 811, controller 101 sends 818 a SIP OK to the monitor/recorder 102. The SIP OK message in step 818 completes the set up for the first media stream and the second media stream to the monitor/recorder 102. The monitor/recorder 102 acknowledges the SIP OK by sending 819 a SIP ACK to controller 101. The first media stream from the first SIP device 104 is sent 820 by controller 101 to the monitor/recorder 102. The second media stream from the second SIP device 105 is sent 821 by controller 101 to the monitor/recorder 102. The monitor/recorder 102 may optionally, based on events, record one or more of the media streams.

Of course, various changes and modifications to the illustrative embodiment described above will be apparent to those skilled in the art. These changes and modifications can be made without departing from the spirit and the scope of the system and method and without diminishing its attendant advantages. It is therefore intended that such changes and modifications be covered by the following claims except insofar as limited by the prior art.

REFERENCES

[RFC3261] Rosenberg, J., Schulzrinne, H., Camarillo, G., Johnston, A., Peterson, J., Sparks, R., Handley, M., and E. Schooler, "SIP: Session Initiation Protocol", RFC 3261, June 2002.
[RFC3264] Rosenberg, J. and H. Schulzrinne, "An Offer/Answer Model with Session Description Protocol (SDP)", RFC 3264, June 2002.
[RFC3550] Schulzrinne, H., Casner, S., Frederick, R., and V. Jacobson, "RTP: A Transport Protocol for Real-Time Applications", RFC 3550, July 2003.
[RFC3711] Baugher, M., McGrew, D., Naslund, M., Carrara, E., and K. Norrman, "The Secure Real-time Transport Protocol (SRTP)", RFC 3711, March 2004.
[RFC3265] Roach, A., "Session Initiation Protocol (SIP)-Specific Event Notification", RFC 3265, June 2002.
[RFC3911] Mahy, R. and D. Petrie, "The Session Initiation Protocol (SIP) "Join" Header", RFC 3911, October 2004.

What is claimed is:

1. A system for remote call monitoring of a call set up between a first Session Initiation Protocol (SIP) device and a second SIP device comprising:
   a. a monitor adapted to receive a first media stream from the first SIP device and/or a second media stream from the second SIP device;
   b. a controller adapted to derive information from at least both a first SIP INVITE message from the first SIP device and a response message from the second SIP device to generate one or more additional SIP INVITE messages, wherein the response message comprises a SIP OK message sent in response to the first SIP INVITE message; and
   c. wherein the monitor is adapted to receive the first media stream and/or the second media stream in response to receipt of the one or more additional SIP INVITE messages.

2. The system of claim 1, wherein the monitor is a recorder.

3. The system of claim 2, wherein the recorder is adapted to record the first media stream and/or second media stream in response to an option selected from the group comprising: to not record either of the media streams, to record portions of either of the media streams, and to record both media streams.

4. The system of claim 2, wherein the controller is adapted to disconnect the call if the first media stream and/or the second media stream cannot be set up.

5. The system of claim 4, wherein the recorder is adapted to send a SIP BYE to disconnect the call.

6. The system of claim 2, wherein the recorder is adapted to stop recording the call in response to receipt of a hold message from the first SIP device.

7. The system of claim 6, wherein the recorder is adapted to resume recording the call in response to receipt of an unhold message from the first SIP device.

8. The system of claim 2, wherein the recorder is adapted to record the call in response to subscribing to an event.

9. The system of claim 8, wherein the event is at least one item selected from the group comprising: the first SIP device's telephone number, the second SIP device's telephone number, a non-call center telephone number, an outbound call telephone number and an inbound telephone number.

10. The system of claim 9, wherein the controller is adapted to notify the recorder that the event has occurred.

11. The system of claim 2, wherein the first media stream and the second media stream are mixed at the recorder.

12. The system of claim 2, wherein the first media stream and/or the second media stream received at the recorder is encrypted.

13. The system of claim 12, wherein the recorder is adapted to receive an encryption key for decrypting the first media stream and/or the second media stream.

14. The system of claim 2, wherein the call is at least one item selected from the group comprising: a voice call, a video call, a text message call, and a multimedia call.

15. The system of claim 2, wherein the controller is adapted to disconnect the call in response to a lack of receipt of a response from the recorder.

16. The system of claim 1, wherein the information derived from the first SIP message is SDP information.

17. The system of claim 1, wherein the information derived from the response message is SDP information.

18. A method for remote call monitoring comprising:
   a. setting up a call from a first SIP device to a second SIP device;
   b. deriving information from a first SIP INVITE message from the first SIP device;
   c. deriving information from a SIP response message from the second SIP device, wherein the SIP response message is sent in response to the first SIP INVITE message;
   d. generating one or more additional SIP INVITE messages using the information from at least both the first SIP INVITE message and the information from the SIP response message;
   e. sending the one or more additional SIP INVITE messages to a monitor to set up a first media stream from the first SIP device and/or a second media stream from the second SIP device to the monitor; and
   f. receiving the first media stream and/or the second media stream at the monitor.

19. The method of claim 18, wherein the response message is a SIP OK.

20. The method of claim 18, wherein the monitor is a recorder.

21. The method of claim 20, wherein the recorder records the first media stream and/or the second media stream responsive to an option selected from the group comprising: not recording either of the media streams, recording portions of either of the media streams, and recording both media streams.

22. The method of claim 20, wherein if the first media stream and/or the second media stream cannot be set up, the call is disconnected.

23. The method of claim 22, further comprising: sending a SIP BYE from the recorder to disconnect the call.

24. The method of claim 20, further comprising: receiving a hold message from the first SIP device and wherein the recorder stops recording the call.

25. The method of claim 20, further comprising: receiving an unhold message from the first SIP device and wherein the recorder resumes recording the call.

26. The method of claim 20, further comprising: the recorder subscribing to record the call based on an event.

27. The method of claim 26, wherein the event is at least one item selected from the group comprising: the first SIP device's telephone number, the second SIP device's telephone number, a non-call center telephone number, an outbound call telephone number and an inbound telephone number.

28. The method of claim 27, further comprising: notifying the recorder that the event has occurred.

29. The method of claim 20, wherein the first media stream and the second media stream are mixed at the recorder.

30. The method of claim 20, wherein the first media stream and/or the second media stream received at the recorder is encrypted.

31. The method of claim 30 further comprising: receiving an encryption key at the recorder to decrypt the first media stream and/or the second media stream received at the recorder.

32. The method of claim 20, wherein the call is at least one item selected from the group comprising: a voice call, a video call, a text message call, and a multimedia call.

33. The method of claim 20, wherein the call is disconnected if controller does not receive a response from the recorder.

34. The system of claim 18, wherein the information derived from the first SIP message is SDP information.

35. The system of claim 18, wherein the information derived from the response message is SDP information.

36. An apparatus for performing the method of one of claims 18-35.

37. A method for distributed call monitoring comprising:
  a. in response to receiving a first SIP INVITE of a first SIP device for a second SIP device to join a call with the first SIP device, sending the first SIP INVITE to the second SIP device, deriving SDP information from the first SIP INVITE, and sending a second SIP INVITE with the SDP information to a monitor thereby to set up a first media stream between the first SIP device and the monitor;
  b. in response to receiving a SIP OK of the second SIP device responsive to the first SIP INVITE, deriving SDP information from the SIP OK and sending a third SIP INVITE with the SDP information to the monitor thereby to set up a second media stream between the second SIP device and the monitor; and
  c. sending copies of call traffic sent by the first SIP device and of call traffic sent by the second SIP device as the first and the second media streams to the monitor.

* * * * *